(12) United States Patent
Louat et al.

(10) Patent No.: US 12,179,301 B2
(45) Date of Patent: Dec. 31, 2024

(54) AUTOMATED DRILLING OPTIMIZATION METHOD

(71) Applicants: AIRBUS SAS, Blagnac (FR); AIRBUS OPERATIONS S.L., Madrid (ES)

(72) Inventors: Christophe Louat, Saint Sardos (FR); Arnaud Zanni, Toulouse (FR); Juan Carlos Southwood Carrasco, Madrid (ES)

(73) Assignees: AIRBUS OPERATIONS S.L., Madrid (ES); AIRBUS SAS, Blagnac (FR)

( * ) Notice: Subject to any disclaimer, the term of this patent is extended or adjusted under 35 U.S.C. 154(b) by 981 days.

(21) Appl. No.: 17/187,212

(22) Filed: Feb. 26, 2021

(65) Prior Publication Data
US 2021/0268620 A1 Sep. 2, 2021

(30) Foreign Application Priority Data
Feb. 27, 2020 (EP) .................................... 20382137

(51) Int. Cl.
*B23Q 15/22* (2006.01)
*B23Q 17/22* (2006.01)
*G06N 20/00* (2019.01)

(52) U.S. Cl.
CPC ......... *B23Q 15/22* (2013.01); *B23Q 17/2233* (2013.01); *G06N 20/00* (2019.01)

(58) Field of Classification Search
CPC .... B23Q 15/22; B23Q 17/2233; B23Q 15/26; B23Q 15/24; B23Q 15/013; G06N 20/00; G05B 13/04
See application file for complete search history.

(56) References Cited

U.S. PATENT DOCUMENTS

| | | | |
|---|---|---|---|
| 2018/0303581 A1* | 10/2018 | Martz | ...................... A61C 7/08 |
| 2019/0084112 A1 | 3/2019 | Kojima et al. | |
| 2021/0046642 A1* | 2/2021 | Luis y Prado | ....... B25J 11/0055 |
| 2021/0129326 A1* | 5/2021 | Do | ......................... B25J 9/1661 |

FOREIGN PATENT DOCUMENTS

CN  107457418  12/2017

OTHER PUBLICATIONS

Search Report for EP Application No. 20 38 2137 dated Sep. 1, 2020, 6 pages.

* cited by examiner

*Primary Examiner* — Charles R Kasenge
(74) *Attorney, Agent, or Firm* — Nixon & Vanderhye P.C.

(57) ABSTRACT

A method for optimizing the execution of automated drilling systems controlled by a numerical control, NC, machine, wherein the NC machine performs the following steps: (i) identifying each drill executed by an automated drilling tool at first drilling event (t); storing a theoretical position of each executed drill at the event (t); (iii) calculating a learned position using a machine learning model and based on the stored theoretical position at the event (t); (iv) estimating an intermediate position by applying a tendency statistical function, and (v), if the difference between the intermediate position and the learned position is less than a pre-configured threshold, using the intermediate position for the drilling tool to position a next drill and execute it at a subsequent event (t+1).

4 Claims, 5 Drawing Sheets

AUTOMATED DRILLING OPTIMIZATION METHOD

RELATED APPLICATION

This application claims priority to European Patent Application 20382137-6 filed Feb. 27, 2020, the entirety of which is incorporated by reference.

FIELD

The present invention relates to the field of automated drilling and countersinking processes, such as used in aircraft manufacturing and assembly industry. More particularly, the present invention relates to methods to optimize the execution of automated drilling and/or countersinking machine tools controlled by an automated control system.

BACKGROUND

Numerical control (NC) (also called computer numerical control (CNC)) is the automated control of machining tools, such as drills, countersinks, boring tools, lathes and other manufacturing machinery, by a computer. Numerical control moves and operates machining tools, e.g. a drill, to perform a process, e.g. drill a hole, on a piece of material, such as a metal, plastic, wood, ceramic or composite material. The movements and operation of the machine tool is controlled by a computer executing coded programmed instructions that define the movements of the tool, the position at the material where the tool is positioned to act and the action to be performed by the tool on the material. A human operator may or may not perform some machining steps in conjunction with a numerical control system.

The machining processes performed by numerically controlled machining tools are defined by programmed steps stored in computer code executed by the computer controlling the numerically controlled machine tools. An exemplary process is moving a machine drill from a storage bay in an automated cell along a path to a position at which a hole is to be drilled in a workpiece, e.g., a component to be formed. Each process may include steps including positioning the drill on a workpieces where a hole is to be drilled in the work-piece. Types of machine tool operations that may be performed using numerically controlled systems include laser cutting, welding, friction stir welding, ultrasonic welding, flame and plasma cutting, bending, spinning, hole-punching, pinning, gluing, fabric cutting, sewing, tape and fiber placement, routing, picking and placing, and sawing.

Numerically controlled machine tools, including robotic tools, are commonly used to form components (the workpiece) to manufacture aircraft. An application of numerical control of machine tools for aircraft manufacture is automated drilling of holes and countersinking holes in components of an aircraft. The numerically controlled system moves the drills and other machine tools to a theoretical position specified in the program instructions executed by the computer controlling the tool. The theoretical position is a position on the component that corresponds to a position on the component according to a computer stored map of the component. The stored map may be a theoretical model of the component to be formed or machined by the numerically controlled machine tool(s).

The workpiece, e.g., component of an aircraft, to be machined or otherwise acted upon by a numerically controlled system is typically positioned in an automated cell. The cell may have a bench, e.g., table or other planar surface to receive the part. The tools of the numerically controlled system are typically off to one side of the bench. The tools may be automatically positioned at any position on the bench to reach the part.

Difficulties in numerically controlled machining of parts can arise if there are variances between the theoretical position of a position on a workpiece, such as a location to drill a hole or apply a countersink operation, and the actual position on the workpiece for the hole or countersink. Variances between a theoretical and actual position may arise due to design tolerances in the dimensions of the workpiece and other factors.

Approaches have been developed to compensate for the variances between theoretical and actual positions on a workpiece. One approach is rototranslation, which is the adaptation of a theoretical map of the workpiece, e.g. a drilling map, to the actual dimensions of the workpiece. The actual dimensions may be measured by the numerically controlled machine. This adaptation may result in non-optimized movements of the machine tool such as movements needed to adjust the position of the tool from a position determined by the theoretical position to an actual position on the workpiece on which the tool is to act. The non-optimized movements may reduce the performance of the numerically controlled machining system. There is a need for a method to improve the productivity of automated controlled drilling tools and other machine tools by bringing closer the theory and reality in the execution of movement and positioning processes for drilling.

SUMMARY

The present invention may be applied to solve the above-described problems by providing an automated drilling optimization method which optimizes the performance of a drilling and/or countersinking process executed by an automated control system, such as a numerical control system or other automated robot machine tool.

The present invention may be applied to the positioning of various types of computer controlled and positioned machine tools, such as tools for drilling, countersinking, removal of glue or sealant type products, inspection by sensors, rotating tool, and other machine tools that is automatically controlled. The invention may be applied to optimize computer controlled movements of the machine tools, and particularly to the movements and positions of machine tools in an automated tooling cell to machine and/or to assemble parts for an aircraft.

The present invention may be embodied to: optimize production processes by finding learned positions on a part to compensate for variances between actual positions on a part and the theoretical position on the workpiece as defined in a computer stored instruction or map of the workpiece. The compensation and learned positions may be developed using data generated in previous executions of the machine tools on the workpiece or prior executions on a similar workpiece. The learned positions may be calculated by applying machine learning to use learned positions of drilling or countersinking positions on a workpiece rather than theoretical positions. By using learned positions, the movements needed reposition the machine tool from the learned position to the actual position on the workpiece are reduced as compared to just using the theoretical position. Reducing the movements of the machine tool improves the productivity of a numerically controlled machine. These and other advantages will be apparent in the light of the detailed description of the invention.

The invention may be embodied as method for execution of an automated machining process using a numerical control machine comprising: i) identifying, with a unique identifier defined by the numerical control machine, to a drill process by a drilling tool at an event (t); ii) storing a theoretical position of the drill process executed at the event (t), wherein the theoretical position is a pre-configured static position; iii) calculating a learned position using a machine learning model and based on the stored theoretical position for the event (t); iv) estimating an intermediate position by applying a statistical tendency function, and if a difference between the intermediate position and the learned position is less than a pre-configured threshold, using the intermediate position to position the drilling tool to execute another drill process at subsequent event (t+1); and if the difference between the intermediate position and the learned position is greater than the pre-configured threshold, storing the intermediate position for the subsequent event (t+1) and repeating the steps iii) and iv).

The invention may also be embodied as a method for optimizing the execution of automated drilling systems controlled by a numerical control, NC, machine, wherein the NC machine performs the following steps: (i) identifying each drill executed by an automated drilling tool at first drilling event (t); storing a theoretical position of each executed drill at the event (t); (iii) calculating a learned position using a machine learning model and based on the stored theoretical position at the event (t); (iv) estimating an intermediate position by applying a tendency statistical function, and (v), if the difference between the intermediate position and the learned position is less than a pre-configured threshold, using the intermediate position for the drilling tool to position a next drill and execute it at a subsequent event (t+1).

DESCRIPTION OF DRAWINGS

For the purpose of aiding the understanding of the invention, an embodiment(s) of the invention is illustrated by the following Figures.

DETAILED DESCRIPTION

The embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

Figure 5:
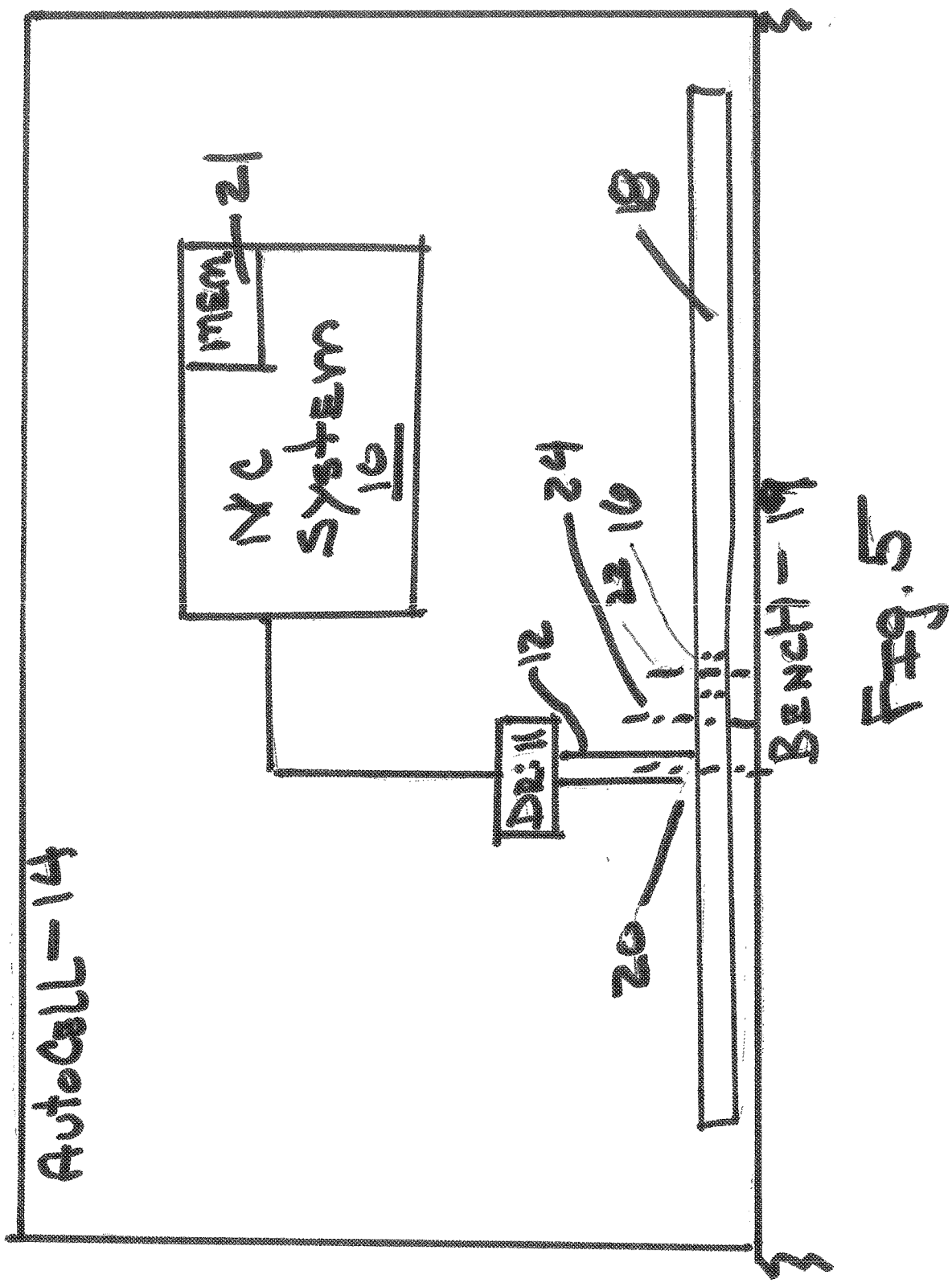
FIG. 5 is a schematic view of a numerically controlled system.

An embodiment of the inventive automated drilling optimization method may use production data from past executions of the automated drilling and machine to learn and adjust the initial positioning of a tool, e.g., drill, at a location to be drilled from a theoretical position, e.g., as specified in a map of the workpiece or part plan for the workpiece. The method uses machine learning to learn the actual positions on a workpiece corresponding to the theoretical positions by using historical data from prior machining processes performed on the workpiece. The numerical control system learns the actual position on a workpiece as compared to a theoretical position from statistical calculations made from previously located actual positions on the workpiece (which may include a similar workpiece) worked by the system. The learned positions may become part of a final deliverable to the part program (or computer numerical control, CNC, file) providing the position values on the workpiece for drilling holes, performing countersink operations and other machining operations. By using the learned positions to initially position a drill or other machine tool at a location on a workpiece, the tool is As shown in FIG. 5, a numerically controlled (NC) system 10 includes a computer controlled drill 12 that operates within an automated cell 14. A hole 16 is to be drilled in a workpiece 18 positioned on a bench 19 in the cell. Each drill 12 has a unique identifier (ID). The ID is defined by the numerical control system 10 executing a stored part program and controlling the automated drill 12. The numerically controlled system 10 executes the movement and operation of the drill 12 based on a part program electronically stored in memory 21, which may include a map of the workpiece with theoretical positions on the workpiece for holes to be drilled.

The NC system moves the drill 12 to a theoretical position 20 corresponding to the position of the drill hole 16 specified in the part program. The NC system adjusts, e.g., moves, the theoretical position 20 of the drill to the actual position 22 of the drill hole. The invention may be embodied to reduce the adjustments needed to move the drill 12 to the actual position 22 for drilling.

The NC system 10 stores in memory 21 historical information regarding the adjustments, e.g., corrections, made to move the drill 12 from a theoretical position to an actual position. The corrections may be a vector representing the direction, angle and distance from a theoretical position to an actual position. The corrections from multiple processes performed by the drill 12 are used to calculate a leaned position 24 for the drill. The calculation may be an estimate made based on a tendency algorithm, such as a linear regression of prior corrections made for the drill 12. During a next or another execution of a drilling process by the drill 12, the learned position 24 may be used to initially position the drill at the drill hole 16 rather than the theoretical position 20.

Each execution of the part program, e.g., execution of an automated movement of the drill, is assigned a unique execution identifier. The execution identifier is linked to the data stored for each execution of the part program (or portion of the part program) for the drill, which also has a unique identifier. The stored executions with their execution identifier provide a database of historical executions of corrections made from a theoretical position for a drill at a hole and the actual position of the drill at the hole. Similarly, the final position of the drill at the end of each execution of the movement and operation of the drill, including the drill's final position, is recorded by the numerical control machine.

By retrieving and analyzing several past executions of the drill including the final drill position and the theoretical or initial drill position, a tendency function is generated. The tendency function is used to predict the theoretically best position for the next execution of the drill. The tendency function may be a regression algorithm. The tendency function is used to generate an intermediate position, e.g., a learned position, between the theoretical position I and the actual position and path of a drill at a location on a workpiece on which a hole is to be drilled. Using the tendency function to supplement the theoretical position of the drill stated in the theoretical steps or map of the part program the computer to position the drill at the hole to better match the actual position on the workpiece where the hole is to be drilled. The tendency function makes use of the learned positions of the drill which are calculated from past executions input in a machine learning model.

Initially, the NC system 10 may use on only theoretical positions to initial position a drill, or other machine tool, on a workpiece 18. The system 10 then moves the drill from the theoretical position to the actual position by analyzing, e.g., checking, the conditions at the workpiece for drilling for accuracy of the intended hole location and, possibly, to ensure quality and safety of the drilling operation. Adjustments are made by the NC system to the position of the drill until the conditions are deemed acceptable by the system. When the location of the drill quality and safety requirements are met, the drilling tool is instructed to execute/perform a drill at the determined (theoretical) position. If any of the quality and safety requirements is not met, the NC machine makes a second movement to adjust the drilling head of the tool to the drilling point, which leads to waste of time and productivity since the first movement resulted in an empty movement (i.e., a movement that does not add value to the drilling process). This second movement of adjustment typically occurs in 90% of executions.

An aim of the automated drilling optimization method is to reduce or avoid a second movement of the drill to move the drill from the theoretical position to the actual position of a hole to be drilled. To reduce or avoid the second movement the tendency function is used to calculate, e.g., estimate, an intermediate position to be used instead of the theoretical position to initial position a drill at a location for a desired hole in the workpiece. This intermediate position is a learned position. The learned position is stored 12 by the NC machine so that the learned position can be used as input in training the machine learning model. The use of learned positions reduces empty movements and optimize the positioning process of the machining tool for drilling and/or countersinking. The use of learned positions allows to reduce the time lapsed between the start of positioning and the start of drilling.

Figure 1:
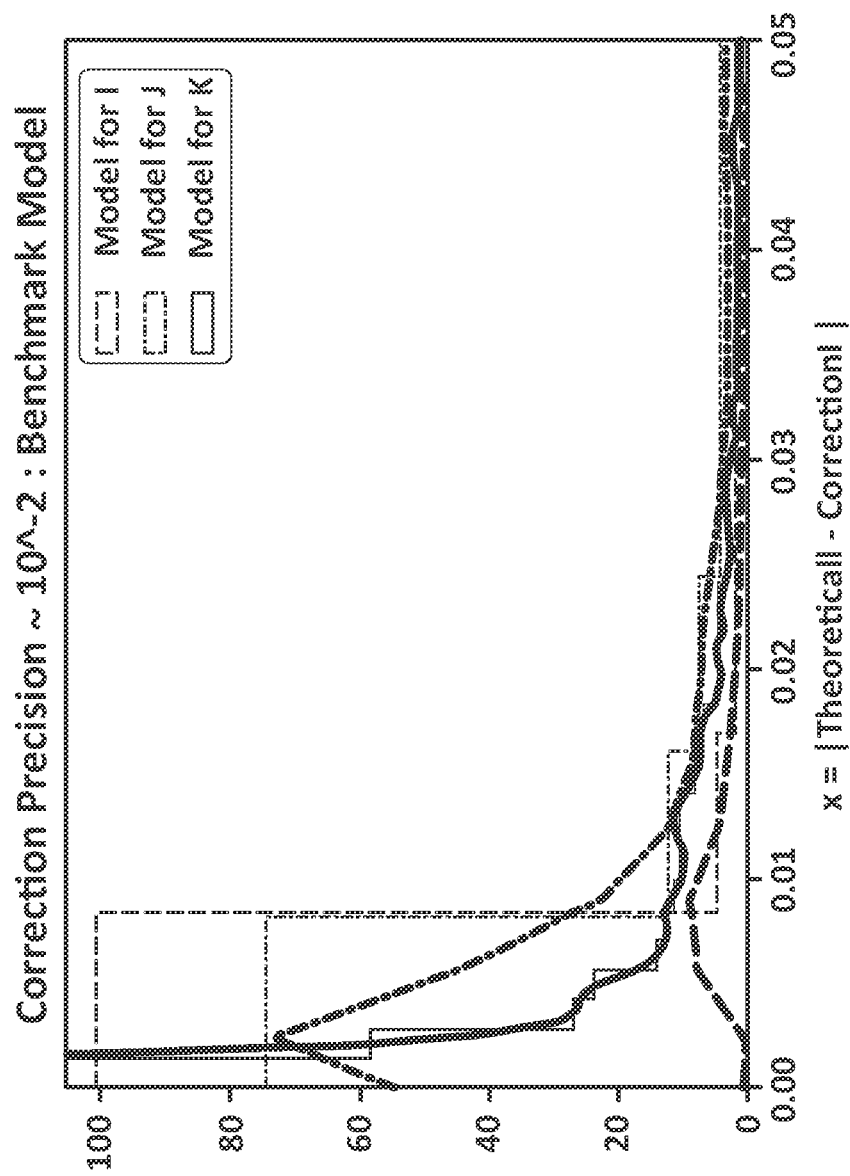
FIG. 1 shows a graphic of the Correction Error distribution of a Benchmark model used for evaluation of a machine learning model used in the Automated Drilling Optimization Method.

In order to evaluate the machine learning (ML) model used in the proposed method to optimize the drilling process, a benchmark model is shown in FIG. 1. At a given drilling operation (t), which corresponds to a new hole needing to be drilled in a workpiece, the following initial assumption is made:

$$\text{Theoretical}\_I_t = \text{Correction}\_I_{t-1}$$

$$\text{Theoretical}\_J_t = \text{Correction}\_J_{t-1}$$

$$\text{Theoretical}\_K_t = \text{Correction}\_K_{t-1}$$

Correction_I, Correction_J and Correction_K are values to be predicted by the machine learning model to reduce the iterations required to be executed by the automated drilling system to correct the initial position of the drill at a workpiece. Correction_I, Correction_J and Correction_K are the components (real numbers) of a normal vector calculated by the NC machine for every drilling hole. The normal vector is a vector (I, J, K) orthogonal to the surface to be drilled at the drilling point or drill position. The subscripts t, t−1, t+1 and the like corresponds to individual hole drilling executed processes or to be executed processes. The individual hole drilling processes may be performed chronologically such that the process "t" is a current drilling process, "t−1" is an immediately prior process and "t+1" is the next to be executed process.

Theoretical_I, Theoretical_J and Theoretical_K are the theoretical values of the drill position, e.g., the theoretical components of the normal vector defined before the optimization of the method. The theoretical values may be determined by a part program such as from an electronical model of the completed workpiece.

The NC machine computes the error made by the automated drilling system for each drilling operation with the drill, e.g., at every event t:

$$|\text{Correction}\_I_t - \text{Theoretical}\_I_t| = |\text{Correction}\_I_t - \text{Correction}\_I_{t-1}|$$

Based on the computed error, a distribution of the corrections (Benchmark Correction Error) is established, as shown in FIG. 1, which illustrates that the dispersion of the correction values mainly moved from 0.00 to 0.01

Figure 2:
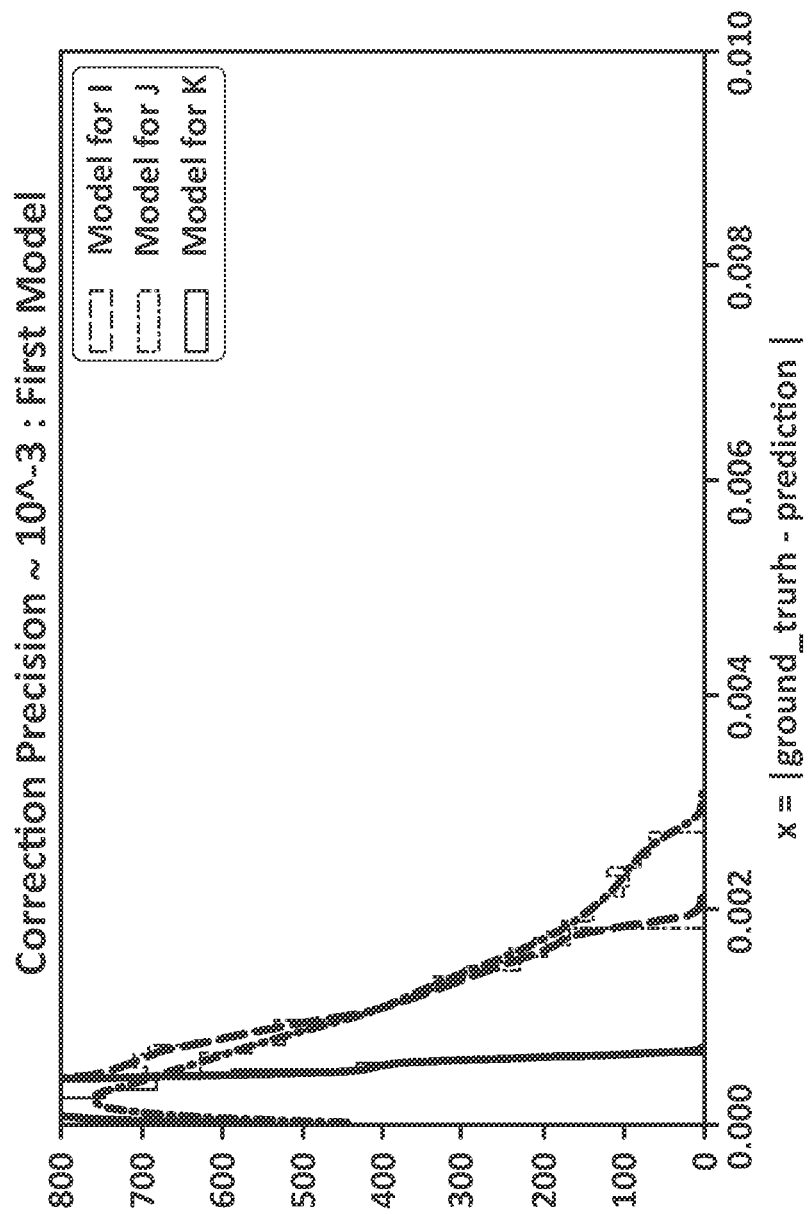
FIG. 2 shows a graphic of the Correction Error distribution of a first machine learning model used in the Automated Drilling Optimization Method.

FIG. 2 shows a first ML model trained to predict the normal vector (I, J, K) for every single drill event t. Each normal vector predicted by ML modelling is called a correction vector and its components are Correction_I, Correction_J and Correction_K, whose values are in sexagesimal degrees of the angular movements to be made by the drilling head of the tool.

This first ML model combines three small models, Model for I, Model for J and Model for K, as shown in FIG. 2, each small model focused on one of the three dimensions of the correction vector.

A small Model for I takes as input a dataset composed of the following values:

$$[\text{Theoretical}\_X_t, \text{Theoretical}\_Y_t, \text{Theoretical}\_Z_t, \text{TDrill}_t, \text{Quarter}_t]$$

The small Model for I returns as output the value of the first component Correction_I$_t$.

The small Model for I operates similarly as do the small Model for J and the small Model for K. The small Model for J returns a second component Correction_J$_t$ and a third component Correction_K$_t$ of the correction vector.

Please note that:

$X_t$, $Y_t$ and $Z_t$ denote the spacial coordinates, e.g., spatial coordinates, where is placed the hole in the learned position.

Theoretical_$X_t$, Theoretical_$Y_t$ and Theoretical_$Z_t$ are theoretical coordinates where the hole is placed before applying machine learning for the optimization of the method.

I, J and K are the components of the normal vector (orthogonal to the surface to be drilled) for the given drill (at the drill position).

TDrill is the identifier or name (only given as reference) of the NC machine to be applied.

Quarter is a name given as reference to a distinct part of a process executed by a numerically controlled system.

The Corrected Prediction Error is computed by the NC machine for every drill operation t and the distribution of the First Correction Error is established. As shown in FIG. 2, the dispersion of the values mainly moved from 0 to 0.001, which means that the first ML model achieves a precision of $10^{-3}$, better than the $10^{-2}$ precision of the benchmark model shown in FIG. 1.

Figure 3:
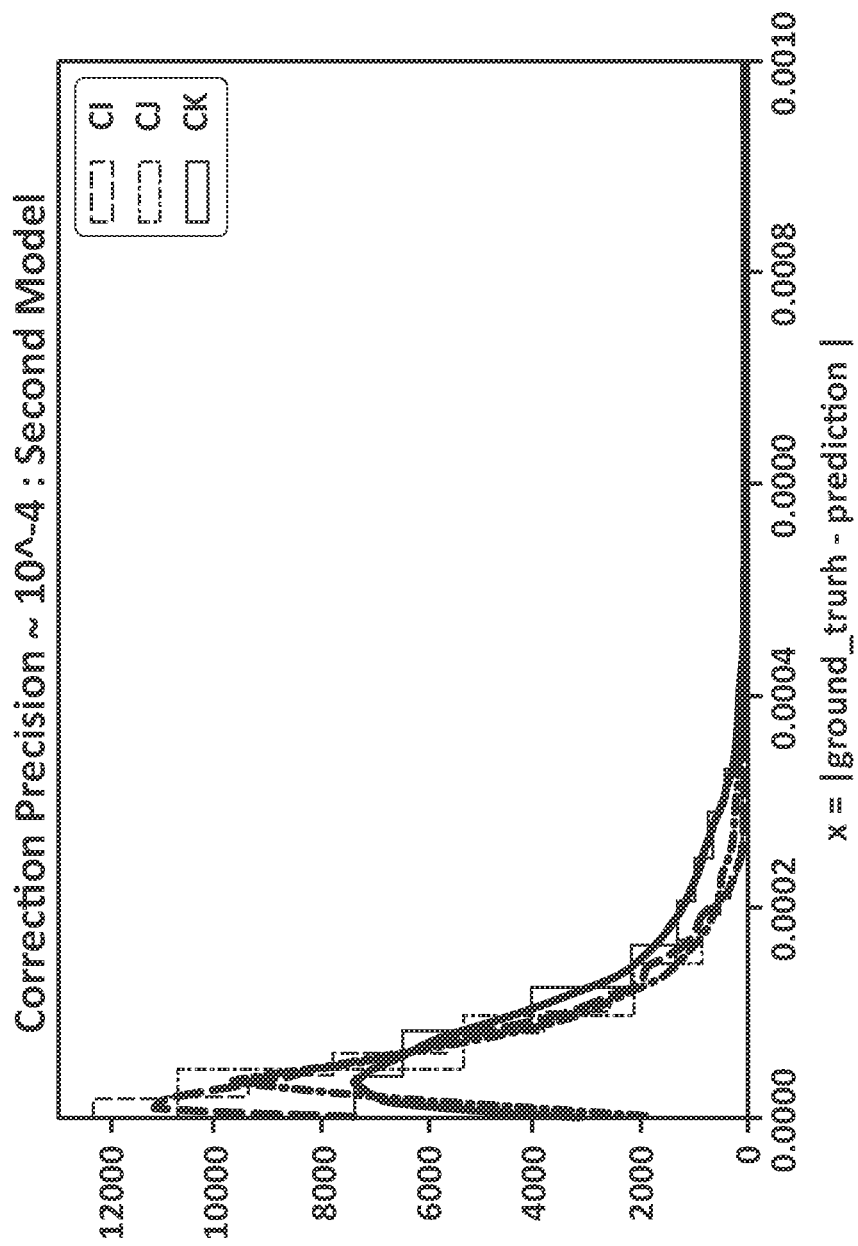
FIG. 3 shows a graphic of the Correction Error distribution of a second machine learning model used in the Automated Drilling Optimization Method.

FIG. 3 shows a second ML model trained to predict the correction vector (I, J, K) for every single drill operation t.

I, J and K are values in sexagesimal degrees of the angular movements to be made by the drilling head of the tool.

This second ML model combines three small models, Model for I, Model for J and Model for K, as shown in FIG. 3, each small model focused on one of the three dimensions of the correction vector.

A small Model for I takes as input the dataset composed of the following values:

[Theoretical_$X_t$,Theoretical_$Y_t$,Theoretical_$Z_t$,TDrill_$t$, Quarter_$t$,Correction_$I_{t-1}$,Correction_$J_{t-1}$,Correction_$K_{t-1}$]

The small Model for I returns as output the value of Correction_$I_t$

It works the same way for the small Model for J and small Model for K.

The Corrected Prediction Error is computed by the NC machine for every drill operation t and the distribution of the Second Correction Error is established. As shown in FIG. 3, the dispersion of the values mainly moved from 0 to 0.0001, which means that the second ML model achieves a further improved precision of $10^{-4}$, which is better than the $10^{-2}$ precision of the benchmark model shown in FIG. 1.

Figure 4:
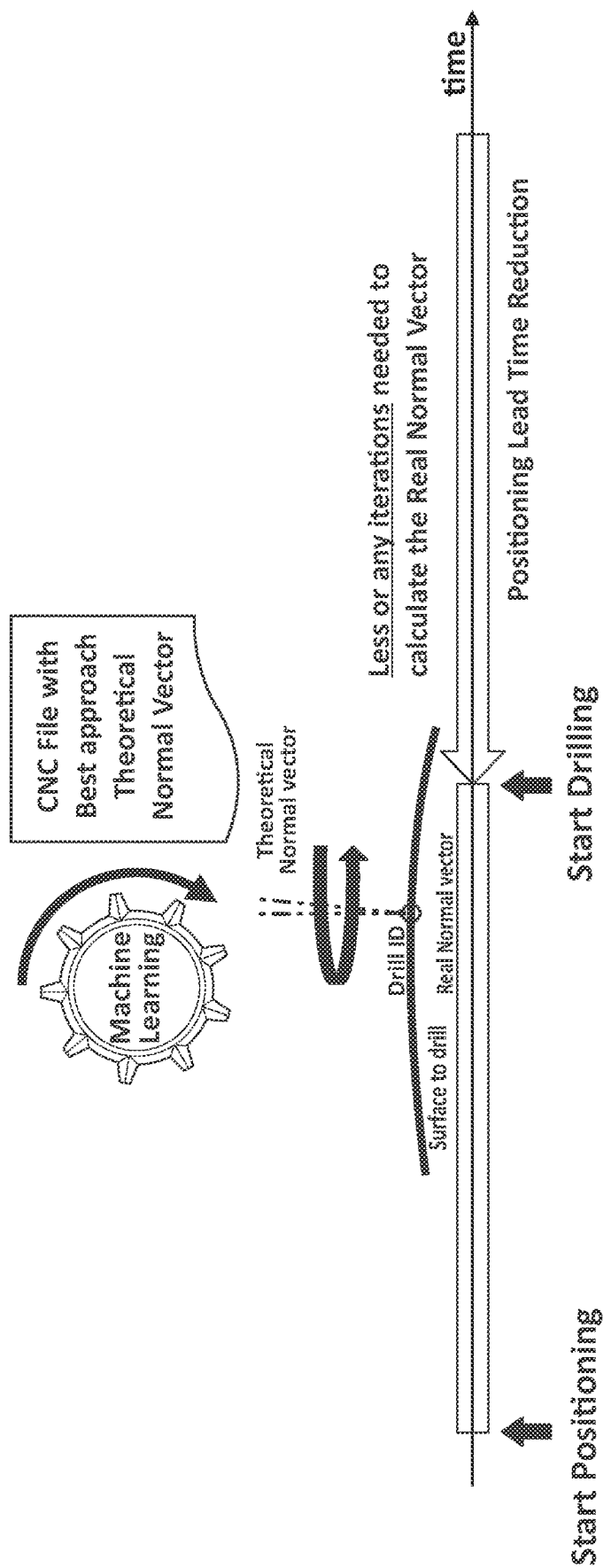
FIG. 4 shows a schematic diagram summarizing the Automated Drilling Optimization Method according to a preferred embodiment.

FIG. 4 is a schematic diagram which summarizes the operation of the automated drilling tool controlled by the NC or CNC machine. The NC machine checks whether the drilling process is stable, that is, whether the differences between the (drilling/countersinking) executions/operations are less than a pre-established threshold (percentage). Then, if stable, the NC machine applies a statistical tendency function (e.g., a regression algorithm) to estimate the most favorable (optimal) position that reduces the time between positioning and drilling. This regression is applied for each drilling operation made to each surface to be drilled. Each drill has its identifier ID for this application. In the machine learning for each identified drill, the theoretical positions and those learned positions that have been obtained in previous drill operations are stored by the NC machine. As known in machine learning, there is a training phase and then a test/operation phase. The machine learning applied by the NC machine as described before achieves a reduction of the positioning lead time, i.e., a reduction of the latency between the initiation and completion of the process of positioning the automated drilling tool to execute the drill.

The pre-requisites needed to ensure a proper optimization of the process are the following:

At the automated cell level (where the NC machine works): (i) Capability to record at execution phase, all the relevant positions for each drill, and (ii) Capability to adapt the part program executed by the NC machine.

At programming level: (i) Capability to identify with a unique ID each drill, and (ii) Keep this ID invariant for each execution, until a design/product of the automated drilling system changes; if a change happens, a new ID has to be issued by the NC machine.

At execution level: (i) Capability to retrieve the relevant data from executions; (ii) Capability of producing no significant variances between executions, and (iii) Capability to adapt the part program to the learned positions calculated by machine learning.

Note that in this text, the term "comprises" and its derivations (such as "comprising", etc.) should not be understood in an excluding sense, that is, these terms should not be interpreted as excluding the possibility that what is described and defined may include further elements, steps, etc.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method execution of an automated machining process using a numerical control machine comprising:
    i) identifying, with a unique identifier defined by the numerical control machine, a drill process to be performed by a drilling tool at an event (t);
    ii) storing a theoretical position of the drill process executed at the event (t), wherein the theoretical position is a pre-configured static position;
    iii) calculating a learned position for the drilling tool using a machine learning model and based on the stored theoretical position for the event (t);
    iv) estimating an intermediate position for the drilling tool by applying a statistical tendency function,
    v) if a difference between the intermediate position and the learned position is less than a pre-configured threshold, using the intermediate position to position the drilling tool to execute another drill process at subsequent event (t+1); and
    vi) if the difference between the intermediate position and the learned position is greater than the pre-configured threshold, storing the intermediate position for the subsequent event (t+1) and repeating the steps iii) and iv),
    wherein the step iii) of calculating the learned position at the event (t) comprises:
        calculating a normal vector for the learned position at the event (t), wherein the normal vector is orthogonal to a surface on a workpiece to be drilled, and the normal vector is defined by components It, Jt and Kt; and
        calculating, using a machine learning model, a correction vector for the event (t), wherein the machine learning model is defined by components Correction_It, Correction_Jt and Correction_Kt, wherein the machine learning model combines a first machine learning model for the component It, a second machine learning model for the component Jt and a third machine learning model for the component Kt,
    wherein the machine learning model receives as input data comprising a theoretical vector defined by Theoretical_Xt, Theoretical_Yt and Theoretical_Zt, which are coordinates in the three dimensional space defining the theoretical position of the drill to be executed at the event (t);
    wherein the first machine learning model returns as output the first component Correction_It of the correction vector;

wherein the second machine learning model returns as output the second component Correction_Jt of the correction vector;

wherein the third machine learning model returns as output the third component Correction_Kt of the correction vector, and wherein the learned position being defined in the three dimensional space by the coordinates Xt, Yt and Zt.

2. The method according to claim 1, wherein the input data taken by the machine learning further comprises a correction vector calculated at a prior event (t−1) with components Correction_It−1, Correction_Jt−1 and Correction_Kt−1.

3. The method according to claim 1, wherein the components of the correction vector are calculated in degrees of angular movement for the automated drilling tool.

4. The method according to claim 1, further comprising computing by the numerical control machine an error for the event (t) corresponding to a difference between the intermediate position and the learned position and determining whether the error is under the pre-configured threshold, the error being computed as

|Correction_It−Correction_It−1| for the first machine learning model,

|Correction_Jt−Correction_Jt−1| for the second machine learning model and

|Correction_Kt−Correction_Kt−1| for the third machine learning model.

\* \* \* \* \*